July 6, 1937. E. R. DAVIS 2,086,156
RECEPTACLE FOR MILK BOTTLES OR THE LIKE
Filed Dec. 27, 1934 2 Sheets-Sheet 2
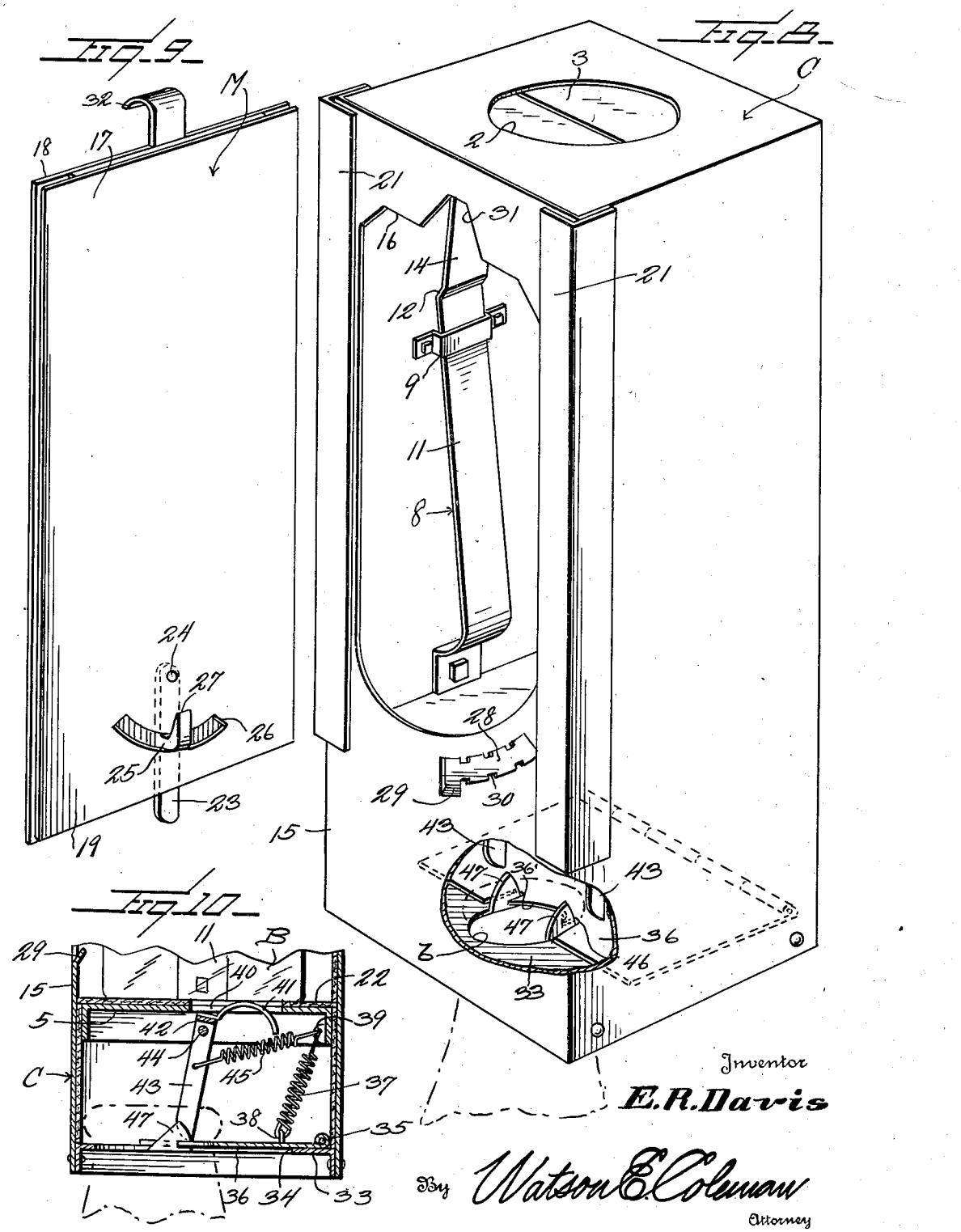
Inventor
E. R. Davis
By Watson E. Coleman
Attorney Patented July 6, 1937

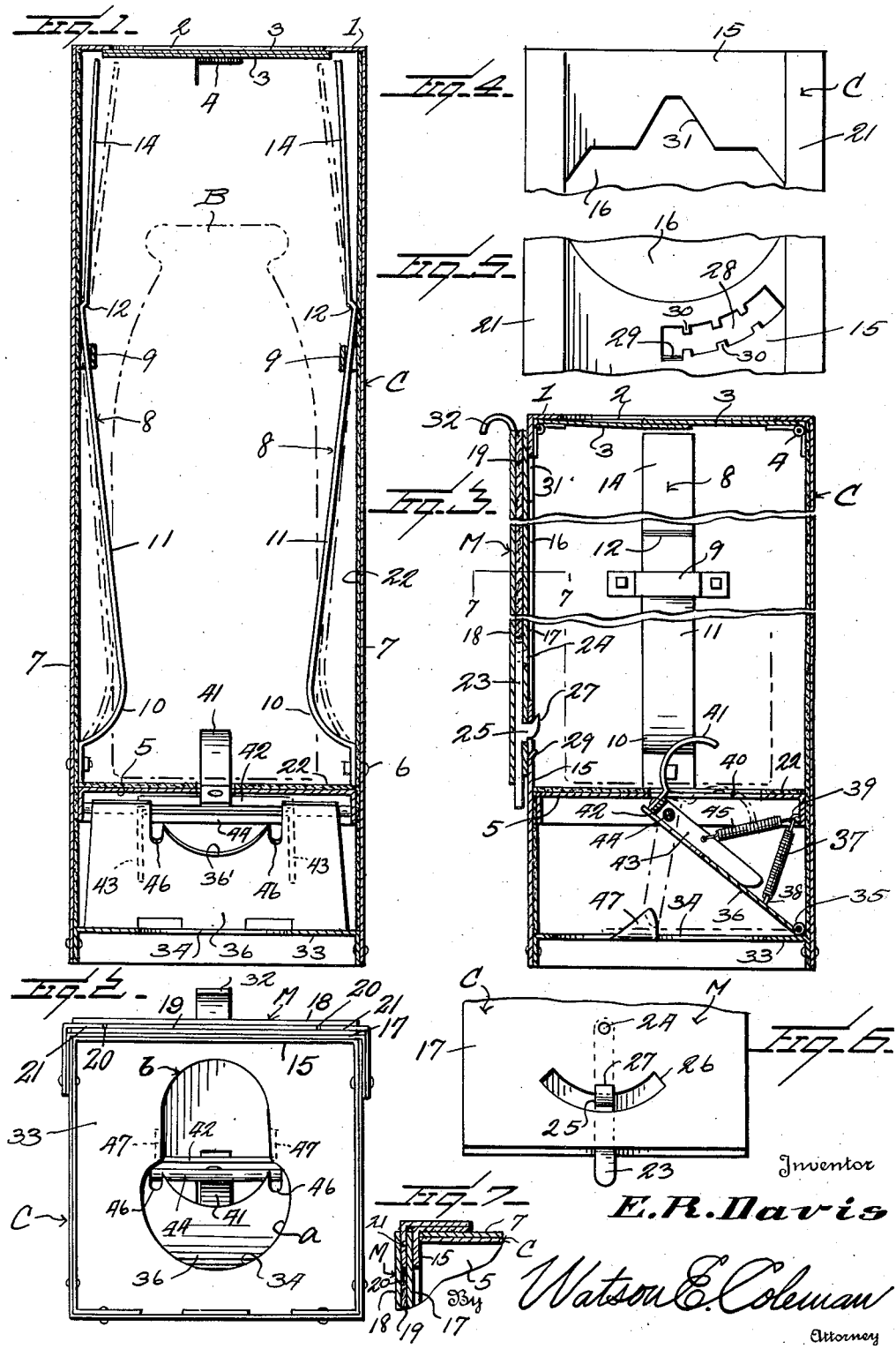

2,086,156

UNITED STATES PATENT OFFICE 2,086,156

RECEPTACLE FOR MILK BOTTLES OR THE LIKE

Edward R. Davis, Wilkes-Barre, Pa., assignor to Norman Hutchinson, Wilkes-Barre, Pa.

Application December 27, 1934, Serial No. 759,414

5 Claims. (Cl. 232—41)

This invention relates to a receptacle for milk bottles or the like, and it is primarily an object of the invention to provide a device of this kind to prevent theft of milk after being delivered and also to provide a placement for the milk upon delivery whereby the same is free of molestation by dogs or cats and other prowlers.

The invention also has for an object to provide a device of this kind having means for holding a second or extra bottle, said second or extra bottle being held against release by the bottle within the container.

Another object of the invention is to provide a device of this kind including a container having an opening to provide for access within the container together with a closure member for said opening, said closure member having means associated therewith to substantially eliminate the possibility of said closure member being moved by an unauthorized person into open position.

The invention consists in the details of construction and in the combination and arrangement of the several parts of my improved receptacle for milk bottles or the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in vertical section taken through a container constructed in accordance with an embodiment of my invention, an applied bottle being diagrammatically indicated by broken lines and a second position of certain of the parts being indicated by broken lines;

Figure 2 is a bottom plan view of the structure as illustrated in Figure 1;

Figure 3 is a fragmentary vertical sectional view taken through the container as herein disclosed, the line of section of Figure 1 being substantially at right angles to the line of section of Figure 2;

Figure 4 is a fragmentary view in elevation of the upper portion of the face of the container provided with the opening to allow access within the container;

Figure 5 is a fragmentary view in elevation of the lower portion of the face of the container as illustrated in Figure 4;

Figure 6 is a view in rear elevation of the lower portion of the lid as herein employed;

Figure 7 is a fragmentary detailed sectional view taken substantially on the line 7—7 of Figure 3.

Figure 8 is a view in perspective of the receptacle embodying my invention with portions broken away and a portion of a bottle indicated by broken lines and the closure member removed;

Figure 9 is a view in perspective of the closure member as herein embodied;

Figure 10 is a fragmentary vertical sectional view taken through the lower portion of the container with the parts shown in locking or holding position with respect to a bottle.

As disclosed in the accompanying drawings, C denotes a container of desired dimensions and preferably having its walls made of sheet metal. The top wall 1 of the container is provided with an opening 2 preferably circular and of a diameter to readily permit the passage therethrough of a bottle B. This opening 2 is normally closed by the lid sections 3 each substantially semi-circular in form with their straight marginal portions lapping. At substantially diametrically opposed points the sections 3 are connected with the top wall 1 by the spring hinges 4 whereby the lid sections 3 are normally maintained in closed position with respect to the opening 2 yet capable of readily swinging downward or inward within the container C to allow the placing of a bottle B within the container C.

The bottom wall 5 for the bottle compartment as herein disclosed, is positioned a material distance inwardly of or above the lower ends of the side walls of the container and secured, as at 6, to opposed side walls 7 of the container. At points immediately adjacent to the bottom wall 5 are the lower end portions of the upwardly disposed elongated leaf springs 8 of a material width. These springs 8 intermediate their ends are freely disposed through the holding or guiding loops 9 carried by the inner faces of the walls 7 of the container C.

The portions 10 of the springs 8 immediately adjacent to their connections 6 are disposed upwardly and inwardly on predetermined curvatures and then continued by the substantially straight and upwardly diverging portions 11. The upper extremities of these portions 11 extend through the loop members 9 and at a point slightly above said loop members 9 have contact with the walls 7 of the container. At this point of contact the springs 8 are slightly inwardly offset, as at 12, and then continued by the upwardly diverging and substantially straight portions 14. The outer or free ends of the portions 14 or, of course, the springs 8 terminate closely adjacent to the top wall 1 and normally beyond the opening 2 and the lid sections 3. The curved portions 10 hereinbefore referred to normally extend inwardly of the container C a distance sufficient to intersect the path of travel of the bottle B as it is placed within the container. As the bottle B passes within the container C the bottom portion thereof will contact with the diverging portions 11 of the springs 8 resulting in a deflection of the curved portions 10 outwardly toward the walls 7, such movement causing the outer extremities of the portions 11 to slide upwardly of the walls 7 to cause the portions 14 to swing inwardly under the lapping portions of the lid sections 3 whereby said lid sections 3 are effectively held against opening movement during the period the bottle B is within the container C as is clearly illustrated by broken lines in Figure 1 of the accompanying drawings.

It is to be stated at this time that the springs 8 are substantially coplanar with each other and with the lapping portions of the lid sections 3 or, in other words, the springs 8 are substantially aligned in a direction substantially at right angles to the alignment of the hinges 4.

A side wall 15 of the container C is provided along a major portion thereof from a point closely adjacent to the bottom wall 5 to a point closely adjacent to the top wall 1 with an opening 16, said opening 16 being of a width to permit the bottle B to be withdrawn therethrough from within the container C.

The container C may be mounted upon a door frame in such position that when the door is closed removal of the bottle B through the opening 16 is prevented. However, in the present embodiment of the invention the opening 16 is closed by a sliding closure member M. This member M in the present instance comprises two overlying plates 17 and 18 of desired dimensions and which have interposed therebetween a lamination or sheet 19 of asbestos or the like. This interposed lamination or sheet 19 results in each longitudinal or side marginal portion of the member M being provided with a groove 20 whereby each side or longitudinal marginal portion of the member M may be slidably engaged or interlocked with a guideway 21 extending along the opposite sides of the side wall 15. The lamination or sheet 19 of asbestos also provides a heat insulating medium and for which reason the side walls of the container C other than the wall 15 and the wall 5 have disposed over the inner faces thereof the asbestos laminations or sheets 22.

The lower portions of the plates 17 and 18 have interposed therebetween a swinging lever 23, an end portion of which being pivotally connected, as at 24, with said plates 17 and 18 at substantially the transverse center of the member M. The lever 23 is of a length to project beyond the lower margin of the member M so that the same may be readily engaged for swinging movement as will hereinafter be more particularly referred to.

At a suitable point intermediate its ends the lever 23 is provided with a rearwardly disposed lug 25 which is directed through an arcuate slot 26 provided in the plate 17 of the member M and which slot 26 is substantially concentric to the pivotal mounting 24 for the lever 23. The free end portion of the lug 25 is continued by an upwardly inclined lip 27, said lip 27 being spaced from the lever 23 a distance sufficient to allow the lip 27 to pass through an arcuate slot 28 provided in the side wall 15 of the container C below the opening 16 in said wall. When the lip 27 is disposed through the slot 28 and the member M lifted to bring the upper face of the lug 25 into contact with the upper edge of the slot 28, the lip 27 will engage rearwardly of the wall 15 with a wedging action thus assuring an effective locking of the member M in closed position.

It is highly important that the member M be maintained in closed position against opening by unauthorized persons. For this reason the slot 28 in the wall 15 is positioned substantially to one side of the transverse center of said wall to bring an end portion thereof substantially in longitudinal alignment with the pivotal connection 24 of the lever 23 with respect to the member M so that when the lever 23, as illustrated in Figure 6, is in a position parallel with the longitudinal axis of the member M the lug 25 will be received within said end portion of the slot as the member M approaches the limit of its downward or closing movement. As the member M is further moved to the limit of its downward or closing movement the lip 27 will contact with the inwardly disposed lip 29 at the lower end portion of the slot 28 allowing the lug 25 to ride up over the wall 15 to a point below the slot 28. This action of the lug 25 is permitted by the inherent resiliency possessed by both the member M and the associated wall 15. The lever 23 is then swung in a direction along the slot 28 a material distance whereupon upward pull is imposed upon the member M. This will cause the lug 25 to again project through the slot 28 and effect a locking of the member M against further upward movement. At spaced points therealong the upper and lower margins of the slot 28 carry the lugs 30 extending inwardly of the slot and which lugs provide stops to prevent swinging movement of the lever 23 unless the member M is moved downwardly a distance sufficient to position the lug 25 within the unobstructed path of travel along the slot 28 between the inner ends of the lugs 30. Upon this adjustment of the member M the lever 23 may be readily swung to the limit of its downward movement to bring the lip 27 of the lug above the lip 29. After this adjustment of the lever 23 the member M can be further moved downwardly whereupon the lug 25 will spring over the side wall 15 below the slot. The lever 23 is then swung in a direction away from the slot 28, or to the left, a distance sufficient to position the lug 25 entirely to one side of the slot 28 whereupon the member M can then be raised to full open position.

Just before the member M reaches its fully raised position, the lug 25 will enter a notch or recess 31 in the wall 15 and communicating with the opening 16. This notch 31 is substantially in the form of an inverted V and as the member M continues to move upwardly the lug 27 will contact with an inclined side margin of the notch 31 and thus automatically return the lever 23 to its straight ahead position as illustrated in Figure 6 so that when the member M is returned to closed position said lever 23 will be properly adjusted to effect the desired locking of the member M in closed position.

To facilitate the desired operation of the member M, the outer plate 18 at its top and substantially at its transverse center is provided with an outwardly disposed finger grip 32. The member M, as is believed obvious to those familiar with devices of this kind, is intended to be adjusted into either open or closed position by the customer as in order to move the member M into open position it is necessary that one be thoroughly familiar with the required operations to move the lever 23 into position to permit opening movement of the member M whereby unauthorized opening movement of said member M is substantially eliminated.

At a desired distance below the bottom wall 5 the container C is provided with a supplemental bottom wall 33 which is provided therethrough with a slot 34. One end portion a of this slot 34 is substantially circular and of a diameter to permit the passage therethrough of the upper open end of the bottle B while the opposite end portion b of said slot 34 is elongated and restricted as to width so as to permit the marginal edges of this portion b to readily engage beneath the top bead of a bottle so that such bottle may be suspended if desired from the bottom wall 33. This bottle may be an empty to be returned or may be a filled bottle should it be desired to deliver two bottles of milk or cream.

Hingedly connected, as at 35, with the marginal portion of the wall 33 in advance of the opening 34 is the marginal portion of a locking plate 36. The opposite end portion of this plate 36 is recessed, as at 36', to allow said plate 36 to be swung down over the portion a of the slot 34 to hold the neck of a bottle within the restricted portion b of the slot 34. The plate 36, however, is normally maintained in a raised or inoperative position through the medium of a retractile member 37 herein disclosed as a coil spring, one end portion of which being secured, as at 38, to the plate 36 and the opposite end of the spring being anchored, as at 39, to the container C at a desired point above the plate 36. The bottom wall 5 of the bottle compartment within the container C is provided with a relatively narrow slot 40 through which projects from below an arcuate trigger member 41. This trigger member 41 is carried by an elongated member 42 disposed at right angles to the slot 40 and positioned below the bottom wall 5. The member 42 at its extremities is provided with the downwardly disposed parallel arms 43 which are freely mounted on a rod 44 carried by the opposed walls 7 of the container C below the bottom wall 5. This mounting of the arms 43 permits the same to have rocking movement and these arms 43 are normally maintained raised by a second retractile member 45 also herein disclosed as a coil spring having one end portion secured to an arm 43 and the opposite end portion also secured at 39 to a wall of the container C.

The upward swinging movement of the plate 36 under the action of the spring 37 is limited by contact of the plate from below with the lower longitudinal marginal portions of the arms 43 and which arms under such conditions are disposed downwardly from the rod 44 on an angle of approximately forty-five degrees. With the plate 36 and the arms 43 in their normal positions as determined by the retractile members or springs 37 and 45, the trigger member 41 extends upwardly through the slot 40 into the lower portion of the bottle compartment within the container C. As a bottle is applied within this compartment the weight of the bottle upon the trigger member 41 will cause the trigger member 41 to swing downwardly in a direction to throw the arms 43 downwardly to bring the plate 36 into its locking or effective position.

The forward portion of the recess 36' at the opposite sides thereof is provided with the notches 46 in each of which is received an upstanding lug 47 carried by the plate 33 at opposite sides of the portion b of the opening 34 at the junction of said portion b with the portion a. These lugs 47 are relatively high and interlock with the lowered plate 36 to prevent the plate 36 being displaced to effect unauthorized removal of a bottle suspended from the plate 33.

From the foregoing description it is thought to be obvious that a receptacle for milk bottles or the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a container having a compartment to receive a milk bottle, a plate carried by the container below the compartment having an opening, one end portion of which being enlarged to allow the neck portion of a second bottle to be engaged within the restricted portion of said opening, a closure plate for the enlarged portion of the opening to hold the neck portion of the bottle within said restricted portion of the opening, and means operating under the influence of the bottle within the compartment of the container for moving the closure plate into effective position and to maintain the closure plate in such position.

2. A device of the class described comprising, in combination, a container having a compartment to receive a milk bottle, a plate carried by the container below the compartment having an opening, one end portion of which being enlarged to allow the neck portion of a second bottle to be engaged within the restricted portion of said opening, a closure plate for the enlarged portion of the opening to hold the neck portion of the bottle within said restricted portion of the opening, and means operating under the influence of the bottle within the compartment of the container for moving the closure plate into effective position and to maintain the closure plate in such position, both of the plates interlocking when the closure plate is in effective position.

3. A device of the class described comprising, in combination, a container having a compartment to receive a milk bottle, a plate carried by the container below the compartment having an opening, one end portion of which being enlarged to allow the neck portion of a second bottle to be engaged within the restricted portion of said opening, a closure plate for the enlarged portion of the opening to hold the neck portion of the bottle within said restricted portion of the opening, means operating under the influence of the bottle within the compartment of the container for moving the closure plate into effective position and to maintain the closure plate in such position, and means for normally maintaining the closure plate in an inoperative position.

4. A device of the class described comprising, in combination, a container having a compartment to receive a milk bottle, a plate positioned below the compartment and having an opening, one end portion of the opening being enlarged to permit the neck portion of a second bottle to be engaged within the restricted portion of the opening, a closure plate, means for supporting said closure plate by the container for swinging movement into a position to close the enlarged portion of the opening, means for normally maintaining said plate raised, a rock arm contacting with the closure plate for moving the closure plate into effective position upon movement of the rock arm in one direction, and a trigger operatively carried by the rock arm, said trigger extending with the compartment of the container when the closure plate is in open position for contact by a bottle applied within the compartment of the container to swing the rock arm in a direction to move the closure member into effective position.

5. A device of the class described comprising, in combination, a container having a compartment to receive a milk bottle, a plate positioned below the compartment and having an opening, one end portion of the opening being enlarged to permit the neck portion of a second bottle to be engaged within the restricted portion of the opening, a closure plate, means for supporting said closure plate by the container for swinging movement into a position to close the enlarged portion of the opening, means for normally maintaining said plate raised, a rock arm contacting with the closure plate for moving the closure plate into effective position upon movement of the rock arm in one direction, a trigger operatively carried by the rock arm, said trigger extending within the compartment of the container when the closure plate is in open position for contact by a bottle applied within the compartment of the container to swing the rock arm in a direction to move the closure member into effective position, and yieldable means for holding the rock arm when the closure member is in open position.

EDWARD R. DAVIS.